(12) United States Patent
Schmidt et al.

(10) Patent No.: US 10,474,181 B2
(45) Date of Patent: Nov. 12, 2019

(54) ADJUSTABLE PEDAL FOR A MOTOR VEHICLE

(71) Applicant: AUDI AG, Ingolstadt (DE)

(72) Inventors: Oliver Schmidt, Geisenfeld (DE); René Pahlig, Zwickau (DE)

(73) Assignee: AUDI AG, Ingolstadt (DE)

( * ) Notice: Subject to any disclaimer, the term of this patent is extended or adjusted under 35 U.S.C. 154(b) by 3 days.

(21) Appl. No.: 15/747,548

(22) PCT Filed: Aug. 3, 2016

(86) PCT No.: PCT/EP2016/001335
§ 371 (c)(1),
(2) Date: Jan. 25, 2018

(87) PCT Pub. No.: WO2017/025176
PCT Pub. Date: Feb. 16, 2017

(65) Prior Publication Data
US 2018/0217627 A1     Aug. 2, 2018

(30) Foreign Application Priority Data

Aug. 7, 2015 (DE) .......... 10 2015 010 833

(51) Int. Cl.
*G05G 1/30* (2008.04)
*B60T 7/04* (2006.01)
(Continued)

(52) U.S. Cl.
CPC ............ *G05G 1/405* (2013.01); *B60T 7/06* (2013.01); *F16H 25/20* (2013.01); *G05G 1/44* (2013.01);
(Continued)

(58) Field of Classification Search
CPC ............ G05G 1/30; G05G 1/305; G05G 1/40; G05G 1/405; G05G 1/44; B60T 7/06; F16H 25/20; F16H 2025/2043
See application file for complete search history.

(56) References Cited

U.S. PATENT DOCUMENTS 6,289,761 B1 * 9/2001 Reynolds ............... G05G 1/405
74/512
6,840,132 B2 * 1/2005 Gohrbandt ............. G05G 1/405
74/512
(Continued)

FOREIGN PATENT DOCUMENTS

DE     100 14 531 A1    8/2001
DE     10335403 A1      3/2005
(Continued)

OTHER PUBLICATIONS

Examination Report dated Apr. 7, 2016 of corresponding German application No. 10 2015 010 833.6; 10 pgs.
(Continued)

*Primary Examiner* — Adam D Rogers
(74) *Attorney, Agent, or Firm* — Maier & Maier, PLLC

(57) ABSTRACT

An adjustable pedal for a motor vehicle. A pedal arm is mounted at a bearing block so as to be able to pivot around a pedal axis and which has an articulation point for coupling to a device that is to be actuated by the pedal. The articulation point is spaced apart from the pedal axis by a first lever arm length; a pedal base body, which is mounted at the pedal arm and can be adjusted in relation to the pedal arm; a pedal plate, which is arranged in a bearing point at the lower end of the pedal base body. The bearing point of the pedal plate is spaced apart from the pedal axis by a second lever arm length; and an adjusting unit.

8 Claims, 3 Drawing Sheets

(51) Int. Cl.
*F16H 25/18* (2006.01)
*G05G 1/405* (2008.04)
*B60T 7/06* (2006.01)
*F16H 25/20* (2006.01)
*G05G 1/44* (2008.04)

(52) U.S. Cl.
CPC ....... *F16H 2025/2043* (2013.01); *G05G 1/30* (2013.01)

(56) References Cited

U.S. PATENT DOCUMENTS

| | | | |
|---|---|---|---|
| 8,960,048 B2* | 2/2015 | Souza | G05G 1/405 74/512 |
| 2003/0084749 A1 | 5/2003 | Orr et al. | |
| 2018/0210482 A1* | 7/2018 | Schmidt | B60K 23/02 |

FOREIGN PATENT DOCUMENTS

| | | |
|---|---|---|
| JP | S63-54615 A | 3/1988 |
| WO | 01/77772 A1 | 10/2001 |

OTHER PUBLICATIONS

International Search Report dated Jan. 17, 2017 of corresponding International application No. PCT/EP2016/001335; 7 pgs.
Written Opinion dated Jan. 17, 2017 of corresponding International application No. PCT/EP2016/001335; 11 pgs.
Notification of Transmittal of Translation of the International Preliminary Report on Patentability dated Feb. 22, 2018, in connection with corresponding international Application No. PCT/EP2016/001335 (7 pgs.).

* cited by examiner

ADJUSTABLE PEDAL FOR A MOTOR VEHICLE

FIELD

The invention relates to an adjustable pedal for a motor vehicle.

BACKGROUND

Adjustable pedals for motor vehicles are sufficiently known from the prior art. By means thereof, it is possible to adjust the position of a pedal in relation to the stature of the driver, namely in that, for smaller persons, the pedal is moved toward the driver in the foot space and, for larger persons, the pedal is moved away from the driver in the foot space.

Such an adjustable pedal for a motor vehicle is disclosed, for example, in DE 103 35 403 A1. The pedal described therein is mounted pivotably around a pedal axis and comprises an upper pedal arm and a lower pedal arm that can be adjusted in relation to the upper pedal arm and has a pedal plate. When the pedal is adjusted, the lower pedal arm and accordingly also the pedal plate arranged rigidly on it make an arcuate movement. The pedal adjustment also influences the pedal transmission ratio, that is, the ratio of the distances between the pedal axis and the pedal plate as well as between the pedal axis and the articulation point for coupling to a device that is to be actuated—for example, for linkage of a push rod of a brake system—which can lead, in turn, to a negative feedback on the braking feel of the driver.

US 2003/0084749 A1 discloses an adjustable pedal, comprising a pedal arm, which can pivot around a bearing axis, and a pedal base body, which can be adjusted in relation to the pedal arm and has a rigid pedal plate. The pedal base body is hereby mounted at the pedal arm so as to be able to pivot around a bearing point.

An adjustable pedal for a motor vehicle with a pedal plate that is arranged at the pedal arm so as to be able to rotate around a pivot bearing is known from WO 01/77772 A1.

SUMMARY

The invention is based on the object of further developing an adjustable pedal for a motor vehicle in such a way that unfavorable pedal transmission ratios, which negatively influence the braking feel of the driver, will be prevented during the adjustment.

In a known way, the adjustable pedal for a motor vehicle comprises a pedal arm, which is mounted at a bearing block so as to pivot around a pedal axis and has an articulation point for coupling to a device that is to be actuated by the pedal, wherein the articulation point is spaced apart from the pedal axis by a first lever arm length $L_1$. The pedal further comprises a pedal base body, which is mounted at the pedal arm and can be adjusted in relation to the pedal arm, a pedal plate, which is arranged in a bearing point at the lower end of the pedal base body, and the bearing point of which is spaced apart from the pedal axis by a second lever arm length $L_2$, and an adjusting unit, which acts as a drive on the pedal base body and by means of which, with a change in the second lever arm length $L_2$, an arcuate adjusting movement of the pedal base body and the pedal plate that is arranged on it can be initiated. In addition, the articulation point can be relatively adjustably mounted in relation to the pedal arm, wherein the adjusting unit also acts as a drive on the adjustably mounted articulation point and, by means of the adjusting unit, the articulation point can be adjusted in relation to the pedal arm with a change in the first lever arm length $L_1$.

In this way, it is ensured that, when the pedal is adjusted, both the first lever arm length $L_1$ and the second lever arm length $L_2$ will be changed in a targeted manner by means of the adjusting unit, so that it is possible to influence specifically the pedal transmission ratio and accordingly to prevent a negative pedal feel.

In accordance with the invention, the pedal base body is mounted at the pedal arm so as to pivot around a first pedal bearing point and around a second pedal bearing point, wherein the two pedal bearing points can be moved in a translationally guided manner in relation to the pedal arm. As viewed in the vertical direction of the motor vehicle (z direction) and in the lengthwise direction of the motor vehicle (x direction), the first bearing point is the upper, rear bearing point and the second bearing point is the lower, front bearing point. The pivotable arrangement of the pedal base body around the two pedal bearing points has the effect that, during an adjusting movement, the pedal base body executes a relative movement around an instantaneous center of rotation. As a result of this, it is ensured in an advantageous way that the arcuate movement of the pedal base body and accordingly of the pedal plate can be influenced in a targeted manner by a corresponding positioning, alignment, and length of the translational guiding of the two pedal bearing points.

In accordance with an embodiment of the invention, the adjusting unit is designed in such a way that, during an adjustment of the pedal, initiated by the adjusting unit, a constant pedal transmission ratio, that is, $$\frac{\text{first lever arm length } (L_1)}{\text{second lever arm length } (L_2)} = \text{constant}$$

is present.

In accordance with another embodiment of the invention, the adjusting unit is designed in such a way that, during an adjustment of the pedal, initiated by the adjusting unit, a defined change in the pedal transmission ratio $$\frac{\text{first lever arm length } (L_1)}{\text{second lever arm length } (L_2)} = \text{constant}$$

occurs.

Preferably, the adjusting unit for this comprises a spindle and an adjustment guide, which is in operative connection with the articulation point via, for example, a coupling rod. The spindle is hereby furnished with a first threaded portion and a second threaded portion. Whereas the first pedal bearing point, designed as a self-aligning nut, is guided on the spindle in the region of the first threaded portion, the adjustment guide, which has an inner thread, is guided in the region of the second threaded portion on the spindle, wherein the two threaded portions have thread pitches that differ in such a way that a constant pedal transmission ratio is present or else the two threaded portions are matched to each other in such a way that a defined change in the pedal transmission ratio occurs.

Alternatively, the adjusting unit for this comprises a first spindle with a first thread pitch, a second spindle with a second thread pitch, and an adjustment guide, which is in operative connection with the articulation point. Whereas the first pedal bearing point, which is designed in the form of a self-aligning nut, is guided on the first spindle, the adjustment guide, which has an inner thread, is guided on the second spindle, wherein the first and second spindles have thread pitches that differ in such a way that a constant pedal transmission ratio is present or else the thread pitches are matched to each other in such a way that a defined change in the pedal transmission ratio occurs.

Through the use of a spindle or of spindles, a continuous adjustment of the pedal position is made possible in an advantageous way.

Preferably, the second pedal bearing point of the pedal base body is designed in the form of a sliding pin, which engages in a sliding track formed in the pedal arm and is guided translationally in the sliding track.

As already discussed, the pedal base body executes a relative movement around an instantaneous center of rotation during an adjusting movement. Depending on the position of the instantaneous center of rotation, the rotational movement is hereby more or less pronounced. Because the pedal plate, which is mounted in fixed position at the pedal base body, executes the same rotational movement, this can result—depending on the angle of rotation—in the pedal plate being positioned unfavorably in extreme positions with respect to the actuating foot of the driver, so that a pedal actuation is impeded.

In order to prevent these drawbacks, it is provided in accordance with an especially advantageous embodiment of the invention that the bearing point of the pedal plate is designed as a pivot bearing and that the pivot bearing of the pedal plate is in operative connection with means that bring about a forcibly guided rotational movement of the pedal plate—directed opposite to the change in the angle of inclination of the pedal plate resulting from the arcuate adjusting movement of the pedal base body in relation to the pedal arm—around the pivot bearing.

Alternatively, it is possible, through the means that bring about the forcibly guided rotational movement of the pedal plate, to rotate the pedal plate also in the direction of rotation of the adjusting movement—for example, when the arcuate adjusting movement of the pedal base body is less strongly pronounced.

Preferably, the means are hereby designed in the form of a Bowden cable connection or coupling rod connection, which is arranged between the pedal plate and the second pedal bearing point. The Bowden cable connection or the coupling rod connection is hereby mounted radially spaced apart from the axis of rotation of the pivot bearing at the pedal plate and radially spaced apart from the pivot axis of the second bearing point, which can move translationally in relation to the pedal arm. Because, during a pedal adjustment, that is, when pedal base body is shifted in accordance with its translational guiding along the pedal arm and the pedal base body rotates in accordance with the position of the two pedal bearing points, a relative movement between the second pedal bearing point and the bearing point of the pedal plate occurs, the Bowden cable connection or the coupling rod connection ensures in an advantageous way that the relative movement between second pedal bearing point and the bearing point of the pedal plate is transformed in accordance with the chosen radial spacing into a rotation of the pedal plate, so that it is possible to compensate for the change in angle of the pedal plate that occurs in consequence of the arcuate adjusting movement.

When the pedal is actuated, high actuation forces sometimes act on the pedal plate, in particular when the contact point lies outside of the rotational axis of the pedal plate. In order to decouple the Bowden cable connection or the coupling rod connection from the actuation forces, it is provided in accordance with another embodiment of the invention that a locking mechanism is integrated in the plate, said locking mechanism impeding any rotational movement of the pedal plate around the pivot bearing and, when the pedal is adjusted, said locking mechanism is unlocked and the pedal plate is released for rotation around the pivot bearing.

Preferably, the locking mechanism comprises a first ring element, which is arranged rotatably on a bearing pin of the pivot bearing and mounts the pedal plate, a second ring element, which is arranged in a rotationally fixed manner on the bearing pin and is arranged so as to be axially movable in relation to the first ring element against a spring force of a spring element, and an electromagnet for axial shifting of the second ring element against the spring force of the spring element. The two ring elements each have a toothing, via which the ring elements are engaged with each other in the locked state or, in the unlocked position, that is, after an axial shift of the second ring element, are not in engagement, so that the first ring element and accordingly the pedal plate can rotate.

Further advantages, features, and possible applications of the present invention ensue from the following description in conjunction with the exemplary embodiments illustrated in the drawing.

BRIEF DESCRIPTION OF THE DRAWINGS

The drawing shows:
FIG. 2*b* a schematic illustration of the kinematic relations during adjustment of the pedal of FIG. 2*a*.

DETAILED DESCRIPTION OF THE DRAWINGS

Figure 1:
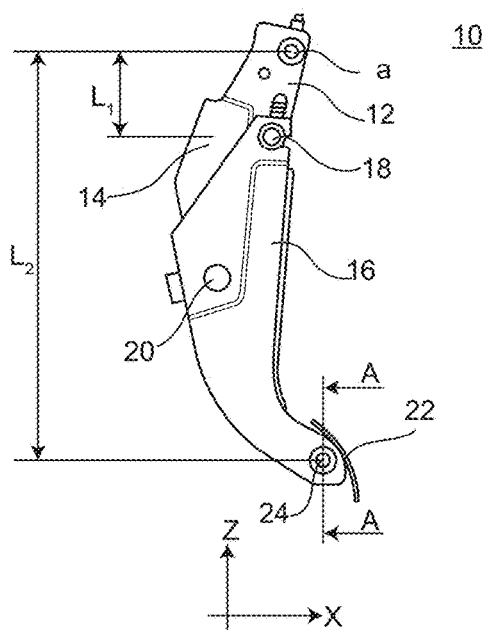
FIG. 1 a side view of a pedal according to the invention.

FIG. 1 shows an adjustable pedal, indicated overall with the reference number 10, for a motor vehicle.

The pedal 10 comprises a pedal arm 12, which is mounted at a bearing block—which, for reasons of clarity, is not illustrated here—so as to pivot around a pedal axis. In known way, the pedal arm 12 has an articulation point 14 (see FIG. 3, 4), by which the pedal 10 can be coupled to an actuating device. (One example of such an actuating device might be, for example, a linkage of a push rod of a brake system.) In the present case, the articulation point 14 is mounted relatively adjustably in relation to the pedal arm 12.

Figures 2, 2A:
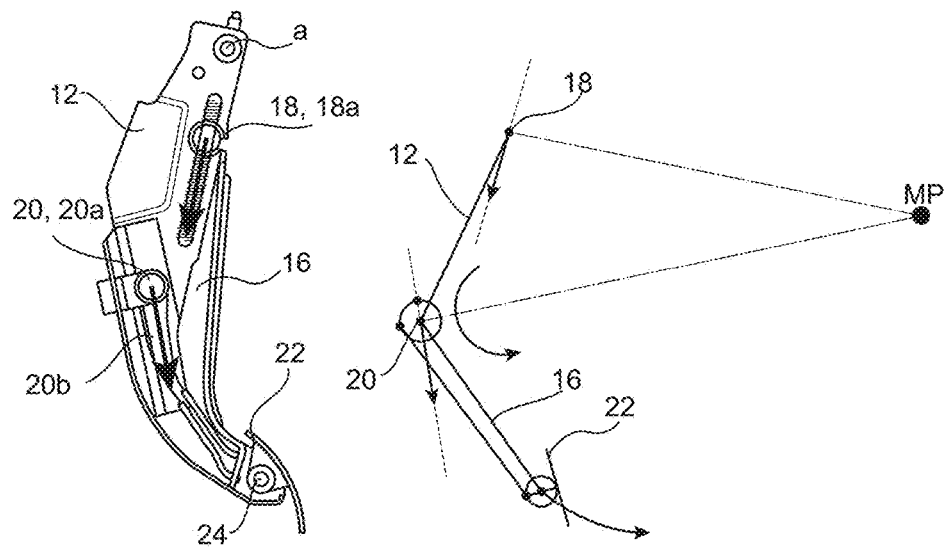
FIG. 2*a* the pedal of FIG. 1 in cut-away illustration.

The pedal 10 further comprises a pedal base body 16, which is mounted pivotably at the pedal arm 12 via a first pedal bearing point 18 and a second pedal bearing point 20, wherein the two pedal bearing points 18, 20, on their part, can each move in a translationally guided manner in relation to the pedal arm 12 (see also FIGS. 2*a-b*).

To this end, as can be seen from FIG. 2 FIGS. 2*a-b*, the first pedal bearing point 18 is designed in the form of a self-aligning nut 18*a*, which is guided translationally on a spindle. The function of the spindle will be addressed in the further course of the description. The second pedal bearing point 20, which is arranged further below and further forward in relation to the first pedal bearing point 18 in the vertical direction of the motor vehicle (z direction) and in the lengthwise direction of the motor vehicle (x direction), is designed in the form of a sliding pin 20a, which engages in a sliding track 20b formed in the pedal arm 12 and is guided translationally in said sliding track.

The pedal 10 further comprises a pedal plate 22, which is arranged at the lower end of the pedal base body 16.

The distance between the pedal axis a and the articulation point 14 is referred to hereinafter as the first lever arm length $L_1$ and the distance between the pedal axis a and the bearing point 24 of the pedal plate 22 is referred to as the second lever arm length $L_2$ (see FIG. 1).

Figure 3:
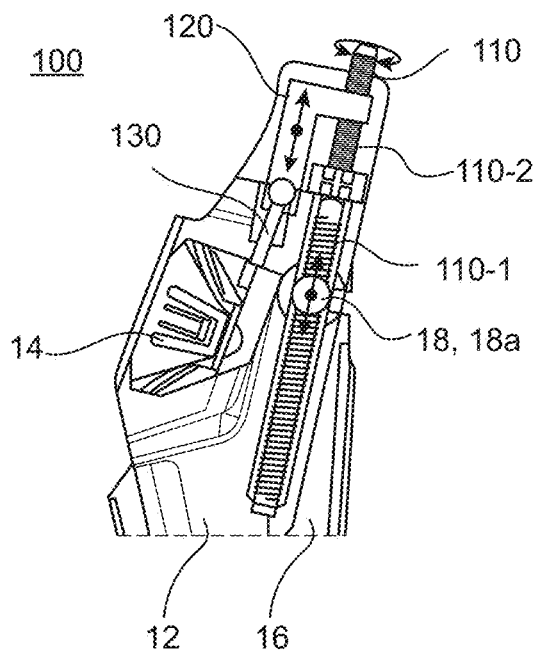
FIG. 3 an enlarged illustration of the adjusting device of the pedal.
Figure 4:
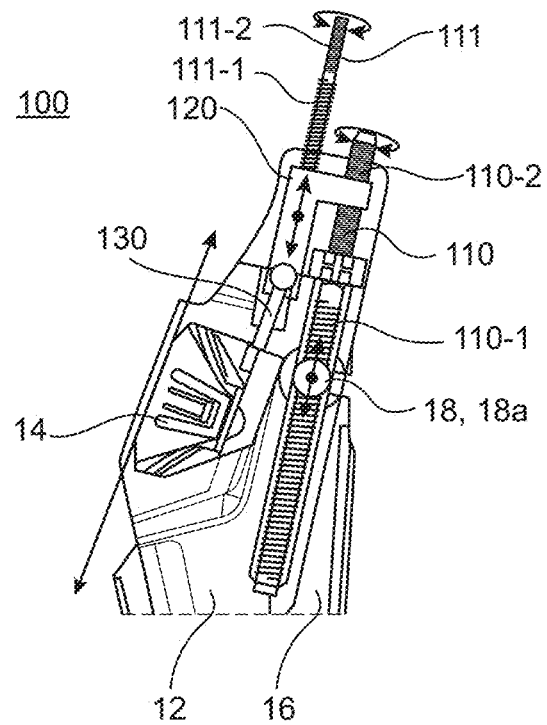
FIG. 4 an enlarged illustration of another adjusting device of the pedal.

In addition, the pedal 10 comprises an adjusting unit, which is indicated overall with the reference number 100, and acts as a drive on the pedal base body 16 and can be initiated by an arcuate adjusting movement of the pedal base body 16 and the pedal plate 22 that is arranged on it (see FIGS. 3 and 4).

In accordance with the embodiment of the adjusting unit 100, which is shown in FIG. 3, said adjusting unit comprises a spindle 110 and an adjustment guide 120, which are in operative connection via a coupling rod 130 with the articulation point 14 that is mounted adjustably at the pedal arm 12. The spindle 110 hereby comprises a first threaded portion 110-1 and a second threaded portion 110-2.

Whereas the first pedal bearing point 18, which is designed as a self-aligning nut 18a, is guided on the spindle 110 in the region of the first threaded portion 110-1, the adjustment guide 120, which has an inner thread, is guided on the spindle 110 in the region of the second threaded portion 110-2.

If the spindle 110 is then driven via a rotary drive, such as, for example, an electric motor, the adjustment guide 120 executes a linear movement on account of the rotation of the spindle 110 and acts as a drive on the articulation point 14 via the coupling rod 130. The direction of movement of the articulation point 14 is hereby predetermined by a guide track in the pedal arm 12. The first lever arm length $L_1$ is influenced based on the movement of the articulation point 14.

The self-aligning nut 18a, that is, the first pedal bearing point 18, executes a linear movement during rotation of the spindle 110 and acts as a drive on the pedal base body 16.

Because the pedal base body 16 is mounted pivotably at the pedal arm 12 via the first pedal bearing point 18, which is designed as a self-aligning nut 18a, and the pedal bearing point 20, which is designed as a sliding pin 20a and, in addition, the self-aligning nut 18a is guided translationally over the sliding track 20b in relation to the pedal arm 12 via the spindle 110 and the sliding pin 20a, the pedal base body 16 executes a relative movement around an instantaneous center of rotation MP (see FIG. 2a), which brings about an advantageous movement of the pedal plate 22.

By way of a targeted influencing of the alignment and length of the movement tracks of the first and second pedal bearing points 18, 20, it is hereby possible to influence in a targeted manner the movement of the pedal plate 22 in an advantageous way.

Based on the described movement of the pedal plate 22, the second lever arm length $L_2$ is also influenced.

In the present case, the two threaded portions 110-1, 110-2 of the spindle 110 have thread pitches that differ in such a way that a constant pedal transmission ratio, that is, $$\frac{\text{first lever arm length }(L_1)}{\text{second lever arm length }(L_2)} = \text{constant}$$

is present.

Another embodiment of the adjusting device 100 is illustrated in FIG. 4. In agreement with the embodiment already described, the adjusting device 100 illustrated in FIG. 4 has a self-aligning nut 18a and an adjustment guide 120, which are in operative connection with the articulation point 14 via a coupling rod 130. In contrast to the embodiment already depicted, the embodiment of the adjusting device 100 illustrated in FIG. 4 has two spindles 110, 111, which have different thread pitches, wherein the self-aligning nut 18a is arranged on one spindle 110 and the adjustment guide is arranged on the other spindle 111, and the self-aligning nut 18a and the adjustment guide 120 are guided translationally via their respective spindles 110, 111. Each spindle 110, 111 may have threaded portions 110-1, 110-2, and 111-1, 111-2.

In the present case, in accordance with the embodiment illustrated in FIG. 4, the thread pitches of the two spindles 110, 111 are matched to each other in such a way that, during an adjustment of the pedal 10, a defined change in the pedal transmission ratio $$\frac{\text{first lever arm length }(L_1)}{\text{second lever arm length }(L_2)} = \text{constant}$$

occurs.

As already discussed, the pedal base body 16 executes a relative movement around an instantaneous center of rotation MP (see FIG. 2a) during the pedal adjustment. Depending on the position of the instantaneous center of rotation MP, the pedal base body 16 and accordingly a pedal plate 22 mounted on it make a more or less strongly pronounced rotational movement. Depending on the angle of rotation each time, this can lead to the pedal plate 22 being positioned unfavorably with respect to the actuating foot of a driver and accordingly the actuation of the pedal being impeded. Therefore, it is of advantage to rotate the pedal plate 22 in such a way, depending on the pedal adjustment, that a simple actuation of the pedal plate 22 is ensured.

Figure 5:
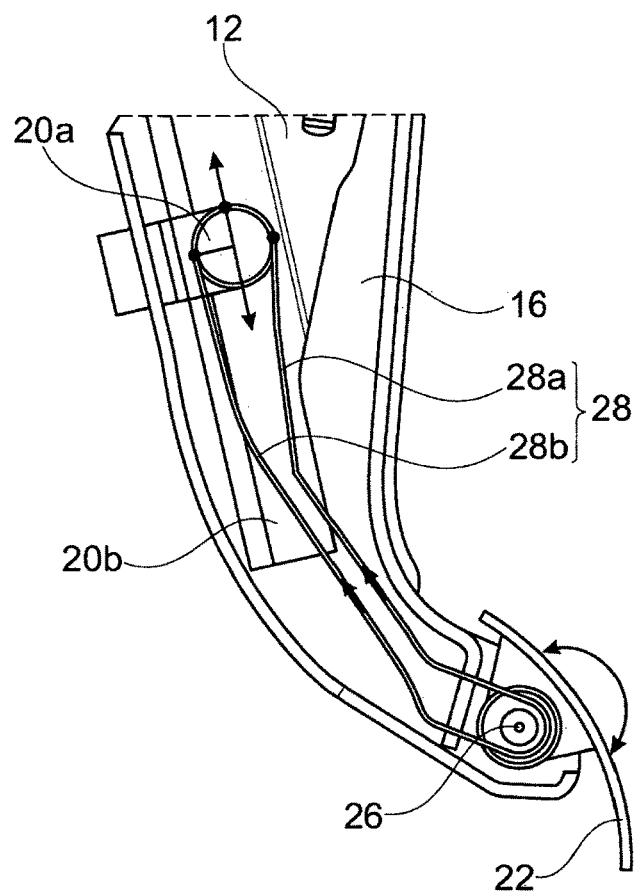
FIG. 5 an enlarged illustration of the adjusting mechanism of the pedal plate.

To this end, as illustrated in FIG. 5, the bearing point 24 of the pedal plate 22 is designed as a pivot bearing 26. In addition, a Bowden cable connection 28 is arranged between the sliding pin 20a and the pedal plate 22. In this case, the Bowden cable connection 28 is attached in a defined radius around the bearing points, that is, the sliding pin 20a or the pivot bearing 26. A transmission ratio results from the ratio of the radii to each other. If the sliding pin 20a then shifts in accordance with its linear guiding in the sliding track 20b and accordingly the pedal base body 16 moves in relation to the pedal arm 12, with simultaneous rotation of the pedal base body 16 around the instantaneous center of rotation MP, there ensues a relative movement between the sliding pin 20a and the pivot bearing 26 of the pedal plate 22. In accordance with the radii, the Bowden cable 28a, 28b of the Bowden cable connection 28 transforms the length change into a rotation of the pedal plate 22 and thereby compensates for the change in angle of the pedal plate 22 as a consequence of a pedal adjustment in a desired way.

Figure 6:
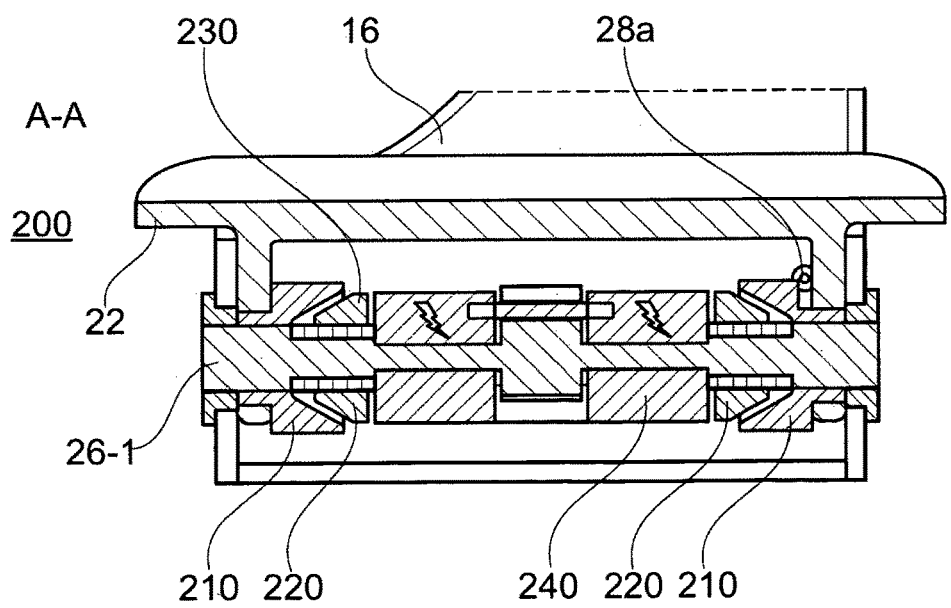
FIG. 6 a sectional illustration along A-A of FIG. 1.

When the pedal 10 is actuated, high actuation forces sometimes act on the pedal plate 22, in particular when the contact point lies outside of the axis of rotation of the pedal plate. In order to decouple the Bowden cable connection 28 from the actuation forces, a locking mechanism 200—as illustrated in FIG. 6—is integrated in the pedal plate 22 and impedes a rotational movement of the pedal plate 22 around the pivot bearing 26 and, during an adjustment of the pedal 10, is unlocked and releases the pedal plate 22 for rotation around the pivot bearing 26.

The locking mechanism 200 comprises two first locking elements 210, which mount the pedal plate 22 and are arranged rotatably on a bearing pin 26-1 of the pivot bearing 26, two second locking elements 220, which are positioned axially lying opposite to the first locking elements 210 and are arranged on the bearing pin 26-1 in a rotationally fixed manner and in an axially movable manner against the spring force of a spring element 230, and an electromagnet 240 for axial shifting of the second locking elements 220 against the spring force of the spring element 230. By way of a conical toothed gear connection, the first and second locking elements 210, 220 are engaged with each other.

If the pedal 10 is then to be adjusted, the second locking elements 220 are lifted from their conical seats by the electromagnet 240. The Bowden cable 28 *a*, 28 *b*, which is arranged at the pedal plate 22, thereupon rotates the pedal plate 22 in accordance with the transmission ratio. If the adjustment operation is concluded or if it requires a locking of the mechanism owing to detection of a driver actuation, for example, the magnetic field is dropped and the second locking elements 220 are once again pressed into their conical seats by the spring element 230.

The invention claimed is:

1. An adjustable pedal for a motor vehicle, comprising:
a pedal arm, which is configured to pivot around a pedal axis and which has an articulation point for coupling to a device that is to be actuated by the pedal, wherein the articulation point is spaced apart from the pedal axis by a first lever arm length;
a pedal base body, which is mounted at the pedal arm and can be adjusted in relation to the pedal arm;
a pedal plate, which is arranged in a bearing point at the lower end of the pedal base body, wherein the bearing point of the pedal plate is spaced apart from the pedal axis by a second lever arm length; and
an adjusting unit, which acts as a drive on the pedal base body and by means of which the pedal base body and the pedal plate are arranged to execute an arcuate adjusting movement in relation to the pedal arm with a change in the second lever arm length,
wherein the articulation point is mounted adjustably in relation to the pedal arm and that the adjusting unit also acts as a drive on the articulation point and the articulation point can be adjusted in relation to the pedal arm by the adjusting unit with a change in the first lever arm length, wherein the pedal base body is mounted at the pedal arm so as to be able to pivot around a first pedal bearing point and around a second pedal bearing point, wherein the first and second pedal bearing points can move in a guided translational manner in relation to the pedal arm.

2. The adjustable pedal according to claim 1, wherein the adjusting unit is designed in such a way that, during an adjustment of the pedal initiated by the adjusting unit, a constant pedal transmission ratio is present, said pedal transmission ratio being a ratio of:

$$\frac{\text{first lever arm length } (L_1)}{\text{second lever arm length } (L_2)} = \text{constant.}$$

3. The adjustable pedal according to claim 1, wherein the adjusting unit is designed in such a way that, during an adjustment of the pedal initiated by the adjusting unit, a predetermined change in a pedal transmission ratio occurs, said pedal transmission ratio being a ratio of:

$$\frac{\text{first lever arm length } (L_1)}{\text{second lever arm length } (L_2)} = \text{constant.}$$

4. The adjustable pedal according to claim 1, wherein the adjusting unit comprises a spindle and an adjustment guide, which is in operative connection with the articulation point, wherein the spindle has a first threaded portion and a second threaded portion, and the first pedal bearing point of the pedal base body is designed in the form of a self-aligning nut, which is guided on the spindle in a region of the first threaded portion, and the adjustment guide is guided on the spindle via an adjustment guide portion, which has an inner thread, in a region of the second threaded portion, wherein the two threaded portions have thread pitches that differ in such a way that a constant pedal transmission ratio is present or else a predetermined change in a pedal transmission ratio occurs.

5. The adjustable pedal according to claim 1, wherein the adjusting unit comprises a first spindle with a first thread pitch, a second spindle with a second thread pitch, and an adjustment guide, which is in operative connection with the articulation point, wherein the first pedal bearing point of the pedal base body is designed in the form of a self-aligning nut, which is guided on the first spindle, and the adjustment guide has an inner thread and is guided on the second spindle, wherein the thread pitches of the first and second spindles are matched to each other in such a way that a constant pedal transmission ratio is present or else a predetermined change in a pedal transmission ratio occurs.

6. The adjustable pedal according to claim 1, wherein the second pedal bearing point of the pedal base body is designed in the form of a sliding pin, which engages in a sliding track formed in the pedal arm and is guided translationally in the sliding track, and in that the bearing point of the pedal plate is designed as a pivot bearing, wherein a Bowden cable connection or a coupling rod connection is formed between the pedal plate and the sliding pin, wherein the Bowden cable connection or the coupling rod connection is arranged in a first radius spaced apart from the sliding pin and in a second radius spaced apart from the pivot bearing in such a way that a ratio of the first radius and second radius results in a transmission ratio, so that, during a shift of the sliding pin in accordance with linear guiding of the sliding pin in the sliding track and accordingly of the pedal base body in relation to the pedal arm and simultaneous rotation of the pedal base body around an instantaneous center of rotation and the thereby resulting length change, the Bowden cable connection or the coupling rod connection transforms the relative movement occurring between the sliding pin and the pivot bearing of the pedal plate into a rotation of the pedal plate.

7. The adjustable pedal according to claim 6, wherein a locking mechanism is integrated in the pedal plate, which blocks a rotational movement of the pedal plate around the pivot bearing and which, during an adjustment of the pedal, is unlocked and releases the pedal plate for rotation around the pivot bearing.

8. The adjustable pedal according to claim 7, wherein the locking mechanism comprises a first locking element, which mounts the pedal plate and is arranged rotatably on a bearing pin of the pivot bearing, a second locking element, which is arranged on the bearing pin in a rotationally fixed manner and in an axially shiftable manner against a spring force of a spring element, and an electromagnet for axial shifting of the second locking element against the spring force of the spring element, wherein the first and second locking elements are engaged with each other via a toothing.

* * * * *